US006469996B1

(12) United States Patent
Dupuy

(10) Patent No.: US 6,469,996 B1
(45) Date of Patent: Oct. 22, 2002

(54) METHOD OF ALLOCATING TRANSMISSION CHANNELS TO A MOBILE STATION, IN PARTICULAR IN DUPLEX MODE, IN A MOBILE PACKET-MODE TELECOMMUNICATIONS NETWORK

(75) Inventor: Pierre Dupuy, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/094,030

(22) Filed: Jun. 9, 1998

(30) Foreign Application Priority Data

Jun. 10, 1997 (FR) .................................. 97 07197

(51) Int. Cl.⁷ .............................. H04J 3/16; H04J 3/00
(52) U.S. Cl. ....................... 370/337; 370/310; 370/328;
370/329; 370/336; 370/345; 370/347; 370/348;
370/431; 370/437; 370/468; 370/522
(58) Field of Search ................................ 370/337, 443,
370/458, 498, 310, 328, 329, 336, 345,
347, 348, 431, 437, 442, 449, 468, 522,
912; 455/7, 68, 69, 70, 92, 95, 103

(56) References Cited

U.S. PATENT DOCUMENTS

| 4,949,395 A | * | 8/1990 | Rydbeck ...................... 455/33 |
| 5,150,362 A | * | 9/1992 | Akerberg .................... 370/95.1 |
| 5,197,125 A | * | 3/1993 | Engel et al. ................ 395/200 |
| 5,260,944 A | * | 11/1993 | Tomabechi ................. 370/95.1 |
| 5,502,722 A | * | 3/1996 | Fulghum .................... 370/69.1 |
| 5,535,207 A | | 7/1996 | Dupont |
| 5,568,511 A | * | 10/1996 | Lampe ....................... 375/211 |
| 5,577,024 A | * | 11/1996 | Malkamaki et al. .......... 370/18 |
| 5,594,738 A | * | 1/1997 | Crisler et al. ................ 370/347 |
| 5,946,306 A | * | 8/1999 | Talarmo ..................... 370/337 |

FOREIGN PATENT DOCUMENTS

| DE | 19543845 A1 | 7/1996 |
| EP | 0681406 A1 | 11/1995 |
| EP | 0687078 A2 | 12/1995 |
| EP | 0720310 A1 | 7/1996 |
| WO | WO9531878 | 11/1995 |

\* cited by examiner

Primary Examiner—Hassan Kizou
Assistant Examiner—Joe Logsden
(74) Attorney, Agent, or Firm—Sughrue Mion, PLLC

(57) ABSTRACT

A method of allocating data transmission channels to a mobile station, in particular in half-duplex mode, in a mobile telecommunications network of the type using packet mode and having multiple access by multiplexing transmission channels, in which method the transmission channels allocated to a mobile station, respectively in a "down" direction from the network to the mobile station, and in an "up" direction from the mobile station to the network, can change at each "allocation period", a transmission authorization received over a transmission channel in the down direction for a given allocation period indicating that the transmission channel is allocated in the up direction for the following allocation period; wherein a transmission authorization received over a transmission channel in the down direction for a given allocation period indicates that not only the transmission channel, also referred to as the authorization channel, but also consecutive transmission channels identifiable from the authorization channel using a predefined relationship, are allocated in the up direction for the following allocation period.

7 Claims, 3 Drawing Sheets

METHOD OF ALLOCATING TRANSMISSION CHANNELS TO A MOBILE STATION, IN PARTICULAR IN DUPLEX MODE, IN A MOBILE PACKET-MODE TELECOMMUNICATIONS NETWORK

The present invention relates generally to techniques for allocating transmission resources in telecommunications networks.

BACKGROUND OF THE INVENTION

It is known that there are essentially two transmission modes in telecommunications networks:
- a transmission mode referred to as "circuit mode", in which transmission resources are allocated for the duration of a call, regardless of whether or not any information is transmitted; and
- a transmission mode referred to as "packet mode", in which transmission resource allocation can be modified during a call, thereby enabling the transmission resources to be shared better between a plurality of calls, as a function of the instantaneous needs of each of them.

Circuit mode is more particularly suited to voice calls, whereas packet mode is more particularly suited to data transmission, in particular when transmission rates are not uniform over time, and also, when they are asymmetrical in the two transmission directions, which is the case in particular when the network is used to transmit data between a telecommunications terminal and a data-processing server.

The present invention relates more particularly to the use of packet mode in mobile telecommunications networks, such use also being known under the name "General Packet Radio Service" (GPRS), for mobile telecommunications networks of the "Global System for Mobile communications" (GSM) type.

It is recalled that the GSM network is a network of the "Time Division Multiple Access" (TDMA) type, in which transmission resources are constituted, as shown in FIG. 1, by time channels or time slots (IT), referenced in FIG. 1 merely by their numbers 0 to 7, in down frames (such as TD0) used for transmission in the network-to-mobile station direction, and in up frames (such as TM0) used for transmission in the mobile station-to-network direction, the down frames and the up frames being carried by distinct carrier frequencies, respectively a "down" frequency and an "up" frequency.

In a GSM network, the same time slot is allocated for a circuit-mode call both in the down frames and in the up frames, where the up frames are also offset in time relative to the down frames, as shown in FIG. 1, by a duration enabling a mobile station operating in "half-duplex" mode to perform the necessary frequency switching, such a mobile station operating in half-duplex mode being equipped with means making it possible to receive on the down frequency and to transmit on the up frequency alternately and not simultaneously.

When the GPRS is used, the time slots allocated to a mobile station for the duration of a call can change from one frame to another. Furthermore, it is known that it is possible to inform the mobile station of the time slots that are allocated to it in the up direction, for a given frame, by addressing a transmission authorization in the down direction, during the preceding frame, and on each of the same time slots, the transmission authorization in practice being contained in a particular bit field referred to as the "Uplink Status Flag (USF)".

With such an authorization mechanism, it can be seen that, to increase the number of consecutive time slots allocated for transmission, it is necessary to increase correspondingly the number of consecutive time slots allocated for reception, but that such an increase is limited by half-duplex mode operation which makes it necessary to provide a certain amount of guard time between the time slots allocated for reception and those allocated for transmission, so that the necessary frequency switching can be performed.

For example, to allocate the four consecutive time slots IT0 to IT3 to a mobile station for transmission, it would be necessary to allocate the four consecutive time slots IT0 to IT3 to it for reception, which, in practice, is impossible for a standard-type mobile station (i.e. a mobile station equipped with a single frequency synthesizer, i.e. requiring a guard time equal to two time slots), as can be seen from FIG. 1.

Thus, in the context of the GSM network and of standard-type mobile stations operating in half-duplex mode, the maximum number of consecutive time slots allocated per frame for reception is equal to four, and the maximum number of consecutive time slots allocated per frame for transmission is equal to three (four consecutive time slots allocated for reception corresponding to two consecutive time slots allocated for transmission, and three consecutive time slots allocated for reception corresponding to three consecutive time slots allocated for transmission).

To avoid that drawback, and therefore to increase the transmission capacity in each frame, it has been proposed to give transmission authorizations once per group of consecutive frames rather than once per frame (i.e. rather than "in-frame"), the authorizations then being given in particular signalling messages referred to as "Fixed Assignment" messages. With such a method, it is then possible to allocate whole frames for transmission (or for reception).

Unfortunately, such a solution also suffers from drawbacks.

In particular, the allocation scheme chosen for an allocation period corresponding to a group of consecutive frames can no longer be modified for the entire period. Unfortunately, allocation needs can change, in particular to satisfy more urgent requests occurring during said period, in which case the initial allocation scheme can be inappropriate. In other words, lengthening the allocation period gives rise to a lack of reactivity from the network.

Furthermore, if the mobile station remains in transmission for too long, in a cellular network such as the GSM network in particular, it can longer listen regularly to neighboring cells, in order to perform measurements firstly to determine which of the cells is the best and is therefore the cell to which the call could be handed over during a handover procedure, and secondly to locate the mobile station, and thus to make it possible to control its transmission power in order to reduce the overall level of interference in the network.

Naturally, provision can be made to reserve certain groups of consecutive frames for performing such measurements on the neighboring cells, but that leads to such measurements being concentrated in time, which means that the results obtained are not properly representative (ideally, to be genuinely representative, the measurements should be distributed over all of the frames).

In addition, to enable the network to determine the number of frames to be reserved for such measurements, the mobile station must transmit to the network the specific signalling messages indicating in particular the number of neighboring cells, the speed at which the mobile station can perform the measurements, etc, this being to the detriment of the payload data to be transmitted.

OBJECTS AND SUMMARY OF THE INVENTION

A main object of the present invention is to provide an allocation system that is a good compromise between the two above-described systems, i.e; that essentially makes it possible to keep the advantage offered by allocation per frame, while permitting a certain amount of increase in transmission capacity per frame.

The present invention thus provides a method of allocating data transmission channels to a mobile station, in particular in half-duplex mode, in a mobile telecommunications network of the type using packet mode and having multiple access by multiplexing transmission channels, in which method the transmission channels allocated to a mobile station, respectively in a "down" direction from the network to the mobile station, and in an "up" direction from the mobile station to the network, can change at each "allocation period", a transmission authorization received over a transmission channel in the down direction for a given allocation period indicating that said transmission channel is allocated in the up direction for the following allocation period;

wherein a transmission authorization received over a transmission channel in the down direction for a given allocation period indicates that not only said transmission channel, also referred to as the authorization channel, but also consecutive transmission channels identifiable from said authorization channel using a predefined relationship, are allocated in the up direction for the following allocation period.

BRIEF DESCRIPTION OF THE DRAWINGS

Other objects and characteristics of the present invention appear on reading the following description of an implementation, given with reference to the accompanying drawings, in which.

MORE DETAILED DESCRIPTION

Figure 2A:
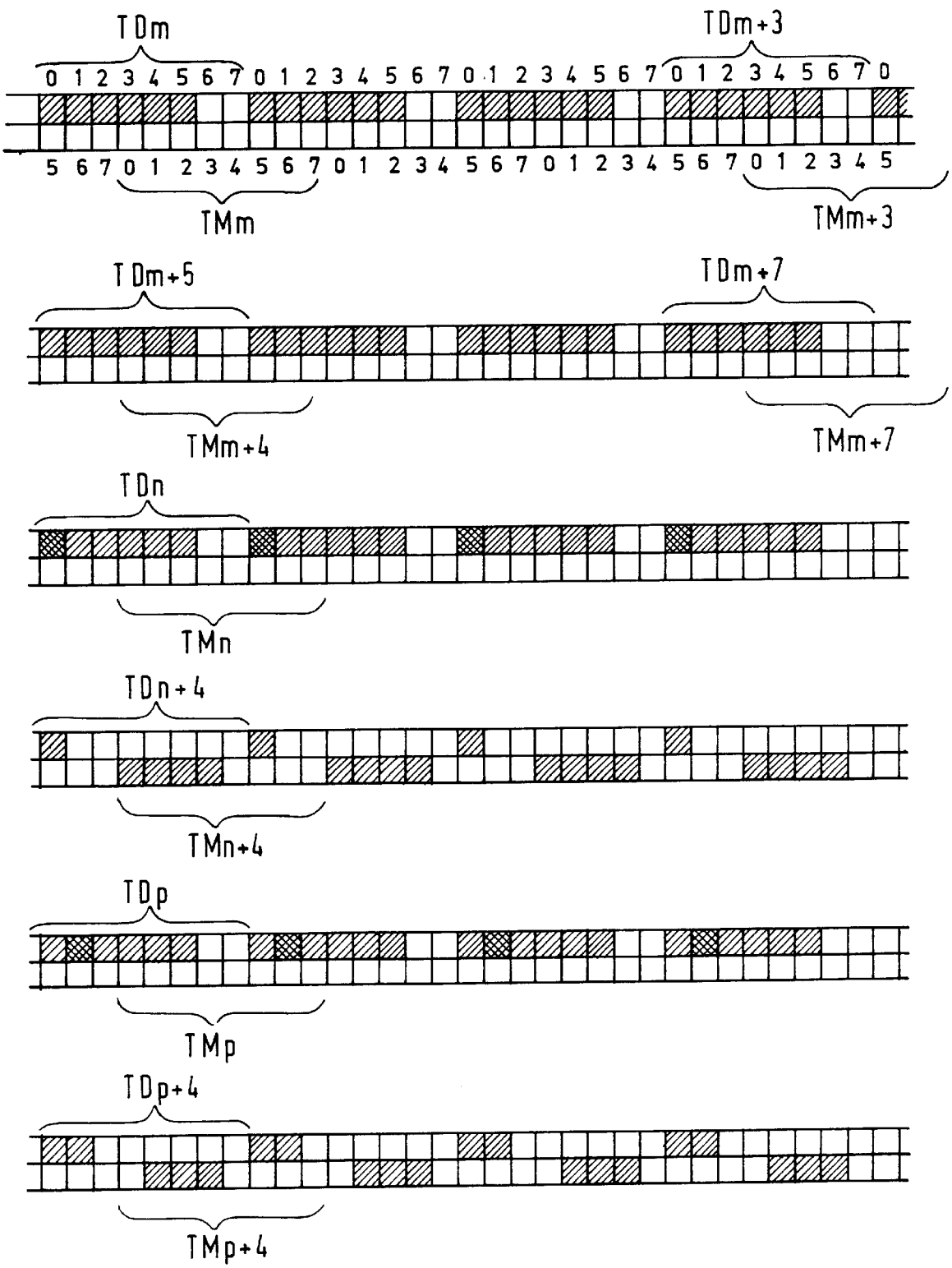
FIG. 2 is a diagram showing various allocation examples of the invention, given by way of example for use in the GPRS provided in a GSM network.
Figure 2B:
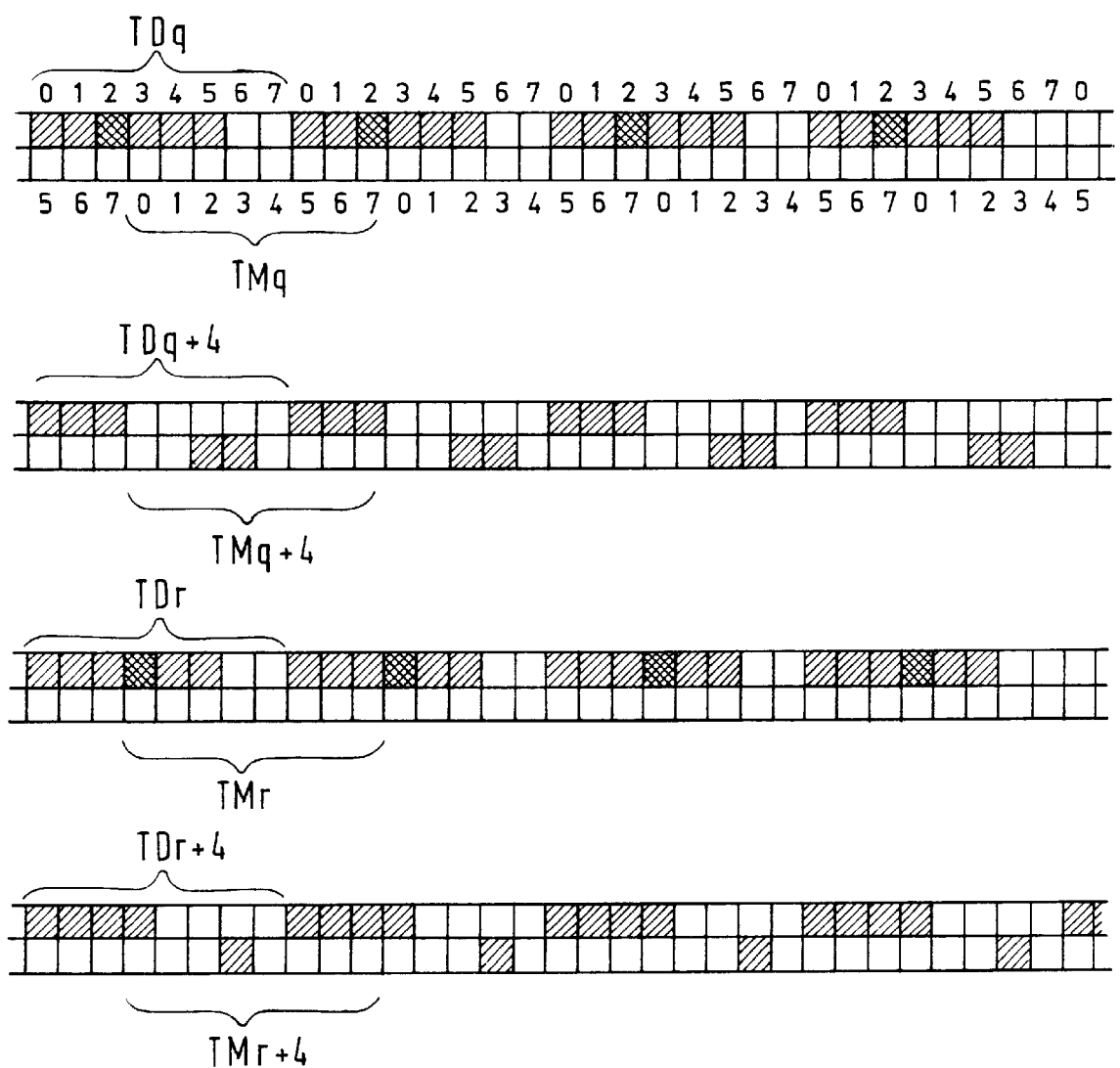

By way of example, FIG. 2 diagrammatically shows a set of successive down frames TDm, . . . TDm+7, . . . , TDn, . . . TDn+7, . . . , TDp, . . . TDp+7, . . . , TDq, . . . TDq+7, TDr, . . . TDr+7, . . . , and a set of corresponding successive up frames TMm, . . . TMm+7, . . . , TMn, . . . TMn+7, . . . , TMp, . . . TMp+7, . . . , TMq, . . . TMq+7, . . . , TMr, . . . TMr+7, . . . , each of the frames comprising, as recalled above, a set of eight time slots IT0 to IT7 (referenced merely by their numbers 0 to 7), and the up frames being, as recalled above, offset relative to the down frames by three time slots.

Hatching is used in FIG. 2 to indicate those time slots in which the network transmits in the down frames to the mobile station, and those time slots in which the mobile station transmits in the up frames to the network, and cross-hatching is used to indicate those time slots in which the network transmits transmission authorizations to the mobile station.

In a first example, corresponding to the case of the down frames TDm to TDm+7 and of the up frames TMm to TMm+7, the network transmits data to the mobile station in the time slots IT0 to IT5 in the down frames TDm to TDm+3, without giving any transmission authorization to the mobile station.

In this case, the mobile station does not transmit in the following up frames TMm+4 to TMm+7, the network then being able to continue to transmit in the frames TMm+4 to TMm+7 in the same was as over the frames TDm to TDm+3, in the time slots IT0 to IT5 in this example.

In a second example, corresponding to the case of the down frames TDn to TDn+7 and of the up frames TMn to TMn+7, the network transmits data to the mobile station in the time slots IT0 to IT5 of the down frames TDn to TDn+3, while also giving a transmission authorization to the mobile station, by way of example in the time slots IT0 of said down frames.

In the second example, the mobile station then transmits data not only in the time slot IT0, also referred to as the authorization time slot, of each of the following up frames TMn+4 to TMn+7, but also in consecutive time slots that can be identified from the authorization time slot using a predefined relationship.

By way of example, in such a predefined relationship, a time window is defined which is formed of adjacent time slots, and in which the authorization time slot is transmitted, said consecutive time slots being constituted by those of the time slots of the time window which lie between the authorization time slot and the last time slot of the window (including said last time slot), and which are considered to be allocatable to the mobile station for a given call.

In the example considered herein of a GSM network, and of a standard-type mobile station operating in half-duplex mode, such a time window must not include more than four adjacent time slots, to take into account the two time slots that are necessary for a standard-type mobile station to perform the required frequency switching.

By way of example, corresponding to the various examples shown in FIG. 2, the time window is formed of the time slots IT0 to IT3, and it is further considered, in the various examples, that all of the time slots of the window may be allocated to the mobile station in question, in particular because none of them are already allocated to another mobile station.

In the second example, since the authorization time slots are constituted by the time slots IT0, the mobile station then transmits data in the time slots IT0 to IT3 of the following up frames, TMn+4 to TMn+7 in this example, the network then transmitting in the time slots IT0 only of the corresponding down frames TDn+4 to TDn+7, so as to leave the mobile station time to perform the necessary frequency switching.

In a third example, corresponding to the case of the down frames TDp to TDp+7 and of the up frames TMp to TMp+7, the network transmits data to the mobile station in the time slots IT0 to IT5 of the down frames TDp to TDp+3, while also giving a transmission authorization to the mobile station in the time slots IT1 of said down frames.

In the third example, the mobile station then transmits data in the time slots IT1 to IT3 in the following up frames, TMp+4 to TMp+7 in this example, the network then transmitting in the time slots IT0 and IT1 only of the corresponding down frames TDp+4 to TDp+7, so as to leave the mobile station time to perform the necessary frequency switching.

In a fourth example, corresponding to the case of the down frames TDq to TDq+7 and of the up frames TMq to TMq+7, the network transmits data to the mobile station in the time slots IT0 to IT5 of the down frames TDq to TDq+3, while also giving a transmission authorization to the mobile station in the time slots IT2 of said down frames.

In the fourth example, the mobile station then transmits data in the time slots IT2 and IT3 in the following up frames, TMq+4 to TMq+7 in this example, the network then transmitting in the time slots IT0 and IT2 only of the corresponding down frames TDq+4 to TDq+7, so as to leave the mobile station time to perform the necessary frequency switching.

In a fifth example, corresponding to the case of the down frames TDr to TDr+7 and of the up frames TMr to TMr+7, the network transmits data to the mobile station in the time slots IT0 to IT5 of the down frames TDr to TDr+3, while also giving a transmission authorization to the mobile station in the time slots IT3 of said down frames.

In the fifth example, the mobile station then transmits data in the time slots IT3 in the following up frames, TMr+4 to TMr+7 in this example, the network then transmitting in the time slots IT0 to IT3 only of the corresponding down frames TDr+4 to TDr+7, so as to leave the mobile station time to perform the necessary frequency switching.

The fifth example, in which a single time slot is thus allocated to the mobile station for transmission, corresponds in particular to the case when the network requests an acknowledgement from the mobile station for a preceding data transmission from the network to the mobile station.

The other examples considered above, in which more than one time slot is allocated to the mobile station for transmission, correspond to cases when the mobile station needs to transmit data to the network, the network being informed of this need by known techniques prior to implementing the authorization procedure.

The choice of the number of time slots allocated to the mobile station for transmission, and thus, in this case, the choice of the location of the authorization time slot, is made by the network, in particular as a function of the transmission needs of the network for transmission to the mobile station.

In other words, said authorization channel is displaced as a function of the quantity of data to be transmitted by the mobile station, so as to reduce, or to increase, the number of said consecutive channels, depending on whether said quantity of data decreases or increases.

In addition, the number of transmission channels allocated for reception is reduced when the number of said consecutive channels is increased, so as to retain a guard time that is long enough between reception and transmission, thereby making half-duplex mode operation possible.

In the example shown, it is considered that all of the time slots of the time window, formed in this example by time slots IT0 to IT3, may be allocated to the mobile station in question for a given call. This is not necessarily the case; for example, if the time slot IT2 of the time window formed by the time slots IT0 to IT3 is not available:

if the authorization is given on time slot IT0, the mobile station transmits on time slots IT0, IT1, and IT3;

if the authorization is given on time slot IT1, the mobile station transmits on time slots IT1 and IT3; and if the authorization is given on time slot IT3, the mobile station transmits, as above, on time slot IT3.

In the example considered herein of a GSM network and of standard-type mobile stations operating in half-duplex mode, it is considered that a time slot allocated neither for transmission nor for reception is necessary to enable the mobile station to perform measurement on the neighboring cells, and that, when frequency switching is also to be performed, in addition to such measuring, two consecutive such non-allocated time slots are necessary that are allocated neither for transmission nor for reception.

Thus, in the various examples shown in FIG. 2, since the time slots IT6 and IT7 of the down frames TDm to TDm+7, TDn to TDn+3, TDp to TDp+3, TDq to TDq+3, and TDr to TDr+3, are allocated neither for transmission nor for reception, they can be used to perform such measuring, and, if necessary, to change the reception frequency when transmission is performed using the frequency hopping technique.

Similarly, in the example shown, the time slots IT1 and IT2 of the down frames TDn+4 to TDn+7, the time slots IT2 and IT3 of the down frames TDp+4 to TDp+7, the time slots IT3 and IT4 of the down frames TDq+4 to TDq+7, and the time slots IT4 and IT5 of the down frames TDr+4 to TDr+7, may be used to perform such measuring and to perform frequency switching.

Thus, it can be seen that, in each of the examples shown in FIG. 2, measurement per frame may be performed, which corresponds to the above-mentioned ideal case.

The only case in which measurement cannot be performed inside a frame corresponds to the case (not specifically illustrated) of a down frame whose time slots (IT0 to IT7) are all allocated for reception.

To compensate for this lack of measurement, and, correspondingly, to maintain a certain number of measurements per unit of time with respect to the network, a solution may be found consisting in displacing the time slots used in the up frames for the acknowledgements by the mobile station to the time slot IT0 in these frames so as to reduce correspondingly the number of time slots allocated for reception on the associated down frames. For example, in the fifth example, by displacing the acknowledgement time slot from the time slot IT3 of the up frames TMr+4 to TMr+7 to the time slot IT2 or IT1 or IT0 of the same frames, it is possible, depending on the case, to release the time slot IT3 or the time slots IT2 and IT3, or the time slots IT1, IT2 and IT3 of the associated down frames TDr+4 to TDr+7, for the purposes of performing such measurements.

Figure 1:
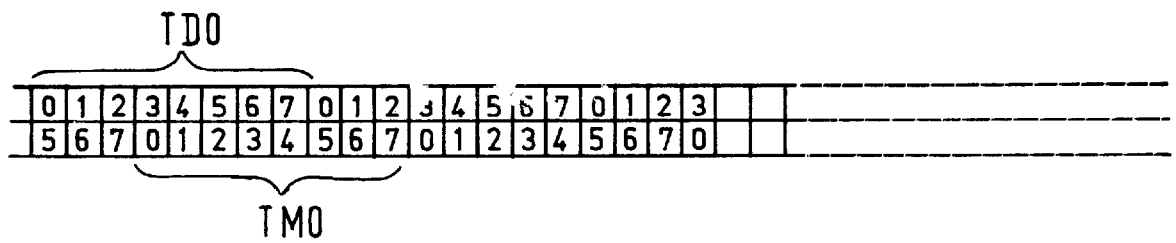
FIG. 1 is a diagram recalling the principle of down frames and up frames in a network such as in particular the GSM network.
Figure 3:
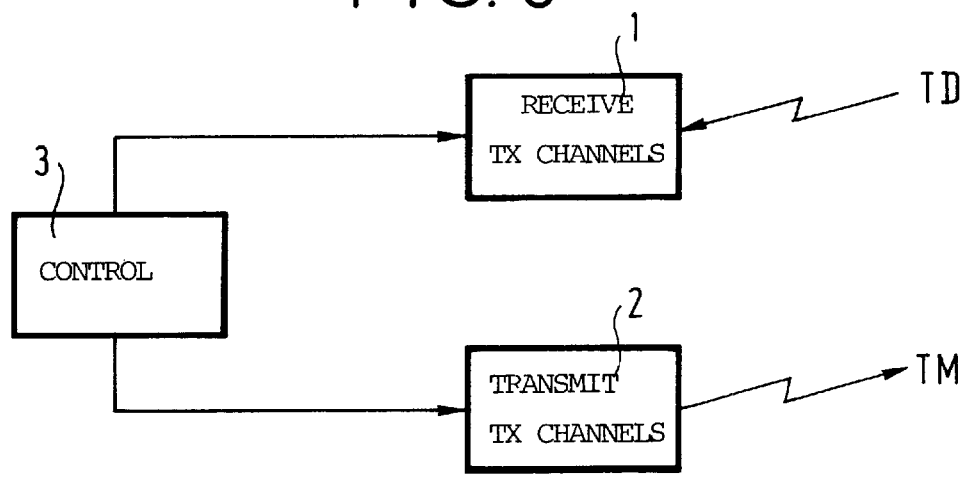
FIG. 3 is a block diagram showing how a mobile station is organized to implement the allocation method of the invention.

In which case, the transmission authorization transmitted in the associated down frames TDr to TDr+3 is transmitted, depending on the case, in the time slot IT2, IT1, or IT0 of these down frames. Although this then leads to more than one time slot being allocated for transmission (depending on the case, the time slots IT2 and IT3, or IT1, IT2, and IT3, or IT0, IT1, IT2, and IT3 of the up frames TMr+4 to TMr+7), only one of these time slots is used for the acknowledgement, thereby further releasing additional time slots for performing measurements. the diagram in FIG. 3 is intended to show the type of means used in a mobile station for using the method of allocation of the invention.

Such a mobile station includes:

receive means 1 for receiving transmission channels over down frames, and for detecting transmission authorizations contained in the received channels;

transmit means 2 for transmitting transmission channels over up frames; and control means 3 for controlling the transmit means and the receive means, so as to enable the method as described to operate.

Figure 4:
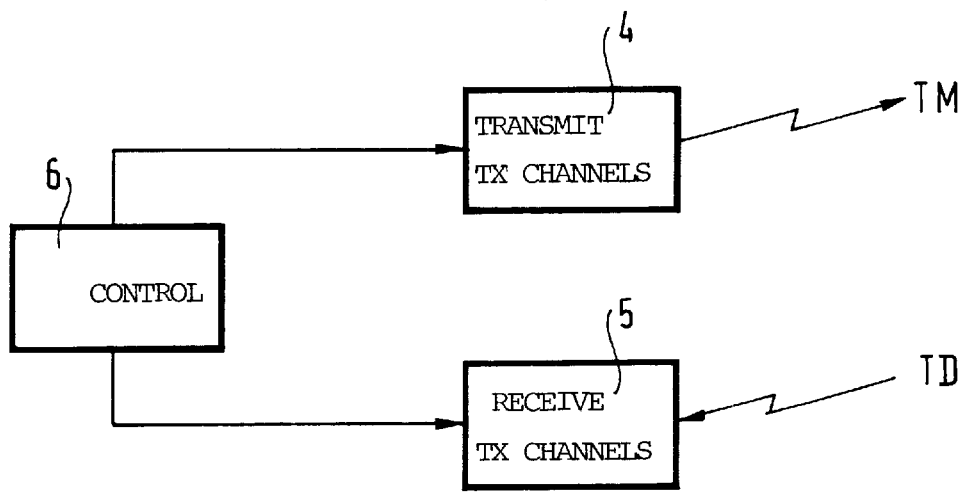
FIG. 4 is a block diagram showing how a fixed station (or base station) of a mobile telecommunications network is organized to implement the allocation method of the invention.

The diagram in FIG. 4 is intended to show the type of means used in a fixed station (also referred to as a "base station") of a mobile telecommunications network, for using the method of allocation of the invention.

Such a fixed station includes:

transmit means 4 for transmitting data in transmission channels over said down frames, as well as transmission authorizations over some of the transmitted channels;

receive means 5 for receiving transmission channels over said up frames; and control means 6 for controlling the transmit means and the receive means, so as to enable the method as described to operate.

The transmit means (2 or 4) or the receive means (1 or 3) may be conventional means which do not therefore need to be re-described herein.

Since the particular embodiment of the control means (3 or 6) enabling the method as described to operate poses no particular problem for a person skilled in the art, it is not described in any more detail either.

It can also be understood that the various cases shown in FIG. 2 are merely examples serving to illustrate the allocation principle of the invention, and that many other cases can occur in practice.

It can also be understood that, although the method of allocation of the invention is described more particularly for the case when the GPRS is used in a GSM network, the invention is not limited to such an application, and neither is it limited to a TDMA network, i.e. a network using multiple access via multiplexing time channels, but rather it applies generally to any network having multiple access by multiplexing transmission channels, whether it be a Time Division Multiple Access (TDMA) network, a Frequency Division Multiple Access (FDMA) network, or a Code Division Multiple Access (CDMA) network.

What is claimed is:

1. A method of allocating data transmission channels to a mobile station in half-duplex mode in a mobile telecommunications network that uses packet mode and has multiple access by multiplexing transmission channels, comprising:

allocating the transmission channels to a mobile station, respectively in a "down" direction from the network to the mobile station, and in an "up" direction from the mobile station to the network;

changing an allocation of said transmission channels at each "allocation period"; and receiving a transmission authorization over a transmission channel in the down direction for a given allocation period, said transmission authorization indicating that said transmission channel is allocated in the up direction for the following allocation period;

wherein said transmission authorization indicates that said transmission channel, also referred to as the authorization channel, and consecutive transmission channels identifiable from said authorization channel as a function of transmission needs of said network, are allocated in the up direction for the following allocation period, and wherein said function of said transmission needs of said network avoids transmission of said transmission authorization during each of said consecutive transmission channels, and a number of said consecutive transmission channels is greater than zero.

2. A method according to claim 1, wherein the function of said transmission needs of said network is such that a window is defined which is formed of adjacent transmission channels and in which the authorization channel is transmitted, said consecutive transmission channels being constituted by those of the transmission channels of the window which lie between the authorization channel and the last time slot in the window (including said last time slot), and which can be allocated to the mobile station for a given call.

3. A method according to claim 1, wherein said authorization channel is displaced, as a function of the quantity of data to be transmitted by the mobile station, so as to reduce, or to increase, the number of said consecutive channels, depending on whether said quantity of data deceases, or increases.

4. A method according to claim 1, wherein the number of transmission channels allocated for reception is reduced when the number of said consecutive channels is increased, so as to leave a guard time between reception and transmission that is long enough to make half-duplex mode operation possible.

5. A method according to claim 1, wherein the authorization time slot serving to authorize transmission of an acknowledgement by the mobile station, in a single transmission channel, is displaced so as to increase the number of said consecutive channels, thereby reducing the number of transmission channels allocated for reception, so as to release transmission channels to enable the mobile station to listen to the network.

6. A mobile station for allocating data transmission channels to a mobile station in half-duplex mode, in a mobile telecommunications network that uses packet mode and has multiple access by multiplexing transmission channels, comprising:

the transmission channels allocated to said mobile station, respectively in a "down" direction from the network to the mobile station, and in an "up" direction from the mobile station to the network, that change at each "allocation period";

a transmission authorization received over a transmission channel in the down direction for a given allocation period indicating that said transmission channel is allocated in the up direction for the following allocation period, wherein said transmission authorization indicates that said transmission channel, also referred to as an authorization channel, and consecutive transmission channels identifiable from said authorization channel as a function of transmission needs of said network, are allocated in the up direction for the following allocation period, said mobile station including:

a receiver that receives transmission channels over down frames and detects transmission authorizations in the received channels;

a transmitter that transmits transmission channels over up frames; and a controller that controls the transmitter and the receiver, to enable said method to operate, wherein said function of said transmission needs of said network avoids transmission of a transmission authorization for each of said consecutive transmission channels, and a number of said consecutive transmission channels is greater than zero.

7. A fixed station for a telecommunications network, for allocating data transmission channels to a mobile station in half-duplex mode in a mobile telecommunications network that uses packet mode and has multiple access by multiplexing transmission channels, comprising:

a mobile station to which the transmission channels are allocated, respectively in a "down" direction from the network to the mobile station, and in an "up" direction from the mobile station to the network, said transmission channels configured to change at each "allocation period";

a transmission authorization received over a transmission channel in the down direction for a given allocation period indicating that said transmission channel is allocated in the up direction for the following allocation period;

wherein said transmission authorization indicates that said transmission channel, also referred to as the authorization channel, and consecutive transmission channels identifiable from said authorization channel as a function of transmission needs of said network, are allocated in the up direction for the following allocation period, said fixed station including:

a transmitter that transmits data in transmission channels over down frames, as well as transmission authorizations over some of the transmitted channels;

a receiver that receives transmission channels over up frames; and a controller that controls said transmitter and said receiver, so as to enable said method to operate, wherein said function of said transmission needs of said network avoids transmission of a transmission authorization for each of said consecutive transmission channels, and a number of said consecutive transmission channels is greater than zero.

* * * * *